United States Patent
Bothien et al.

(10) Patent No.: US 9,429,032 B2
(45) Date of Patent: Aug. 30, 2016

(54) COMBUSTOR TRANSITION

(71) Applicant: ALSTOM Technology Ltd, Baden (CH)

(72) Inventors: Mirko Ruben Bothien, Zürich (CH); Michael Düsing, Rheinfelden (DE)

(73) Assignee: GENERAL ELECTRIC TECHNOLOGY GMBH, Baden (CH)

( * ) Notice: Subject to any disclaimer, the term of this patent is extended or adjusted under 35 U.S.C. 154(b) by 282 days.

(21) Appl. No.: 14/062,001

(22) Filed: Oct. 24, 2013

(65) Prior Publication Data

US 2014/0109578 A1    Apr. 24, 2014

(30) Foreign Application Priority Data

Oct. 24, 2012 (EP) .................................. 12189722

(51) Int. Cl.
  *F01D 9/02*   (2006.01)
  *F23R 3/00*   (2006.01)
  *F02C 7/24*   (2006.01)

(52) U.S. Cl.
  CPC ................ *F01D 9/023* (2013.01); *F02C 7/24* (2013.01); *F23R 3/002* (2013.01); *F05D 2250/52* (2013.01); *F05D 2260/963* (2013.01); *Y10T 29/49229* (2015.01)

(58) Field of Classification Search
  CPC ............ F01D 9/02; F01D 9/023; F02C 3/14; F02C 7/12; F02C 7/18; F02C 7/24; F05D 2240/12; F05D 2240/121; F05D 2260/20; F05D 2260/96; F05D 2260/962; F05D 2260/963; F05D 2900/00014; F23R 3/002; F23R 3/46
  See application file for complete search history.

(56) References Cited

U.S. PATENT DOCUMENTS

| 6,840,048 B2 * | 1/2005 | Han | F01D 9/02 60/39.37 |
|---|---|---|---|
| 2010/0115953 A1 | 5/2010 | Davis, Jr. et al. | |
| 2010/0313568 A1 | 12/2010 | Davis, Jr. et al. | |
| 2011/0116937 A1 * | 5/2011 | Sakamoto | F01D 5/186 416/97 R |
| 2012/0247125 A1 * | 10/2012 | Budmir | F01D 9/023 60/805 |

FOREIGN PATENT DOCUMENTS

| EP | 0 620 363 | 10/1994 |
|---|---|---|
| EP | 0 718 470 | 6/1996 |
| EP | 1 722 069 | 11/2006 |

(Continued)

*Primary Examiner* — Andrew Nguyen
(74) *Attorney, Agent, or Firm* — Buchanan Ingersoll & Rooney PC

(57) ABSTRACT

A combustor transition adapted to guide combustion gases in a hot gas flow path extending between a can combustor and a first stage of turbine in a gas turbine is disclosed. The combustor transition includes a duct having an upstream end adapted for connection to the can combustor and a downstream end adapted for connection to a first stage of a turbine, wherein the downstream end includes an outer wall, an inner wall, a first and a second side wall. At least one side wall has a side wall extension which extends in a downstream direction beyond the outlet. The side wall extension at least partly encloses a first resonator volume and at least one side wall extension includes a resonator hole, which is configured as a neck of a Helmholtz-damper. A method for retrofitting a gas turbine and method for borescope inspection of a GT are disclosed.

15 Claims, 4 Drawing Sheets

(56) References Cited

FOREIGN PATENT DOCUMENTS

| | | |
|---|---|---|
| EP | 2 492 596 | 8/2012 |
| EP | 2 511 612 | 10/2012 |
| JP | 2012-189270 | 10/2012 |
| RU | 2219439 C1 | 12/2003 |
| RU | 2380618 C2 | 1/2010 |
| RU | 2454556 C2 | 6/2012 |
| WO | 2012/134325 | 10/2012 |
| WO | 2012/136787 | 10/2012 |

* cited by examiner

COMBUSTOR TRANSITION

CROSS-REFERENCE TO RELATED APPLICATIONS

This application claims priority to European application 12189722.7 filed Oct. 24, 2012, the contents of which are hereby incorporated in its entirety.

TECHNICAL FIELD

The invention relates to a combustor transition with a wall extension to provide space for a resonator volume arranged as a Helmholtz-damper for thermo acoustic decoupling of adjacent combustors, a turbine comprising such a combustor transition as well as a method for retrofitting a gas turbine with such a combustor transition.

BACKGROUND

Gas turbines with can combustors are known from various applications in power plants. The combustion process in such gas turbines can lead to dynamic can-to-can coupling. Such a dynamic or thermo acoustic coupling of gas turbine can combustors may lead to strong pulsations in particular to strong low frequency pulsations, which negatively affect the stability and lifetime of the combustor. This may lead to reduced lifetime or in extreme cases to a mechanical failure of the gas turbine. In order to mitigate thermo acoustic pulsations usually dampers or resonators are installed in the combustion chamber and/or staging of the fuel supply is done as described for example in the US2010/0313568. Since low frequency dampers require large volumes this solution is not favored. Fuel staging has a detrimental impact on the emission performance due to the creation of local hot spots (leading to $NO_x$ emissions) and local cold spots (leading to CO emissions).

Coupling of the different can combustors takes place through:
- the turbine inlet in the area downstream of the combustors or the combustor transition the piece to the turbine and upstream of the leading edges of the turbine's first stage vanes,
- the main air supply to the burners,
- cooling and leakage air supply to combustor or
- cross-ignition tubes arranged between cans.

SUMMARY

In order to avoid such pulsations effective decoupling of the can combustors is suggested. This invention is intended to decouple thermo acoustic interaction between cans via the turbine inlet, which is seen as the most dominant coupling path. This coupling path is dominant since it has the largest areas and involves the smallest pressure drop between two neighboring cans. In this case the can-to-can type thermo acoustic pulsations can be avoided in general without the need for staging. Hence lifetime is increased and emissions are reduced.

One aspect of the present disclosure is a combustor transition from a can combustor to the turbine inlet adapted to guide combustion gases in a hot gas flow path extending between a gas turbine can combustor and a first stage of turbine. The combustor transition comprises a duct having an inlet at an upstream end adapted for connection to the can combustor and an outlet at a downstream end adapted for connection to a first stage of a turbine. The downstream end comprises an outer wall, an inner wall, as well as a first and a second side wall. The outer and inner walls of adjacent combustor transitions form an annular flow path with an outlet, the outlet being connected to the turbine inlet.

The inlet of a combustor transition typically has the same cross section as the can combustor to which the transition piece is attached. These can for example be a circular, an oval or a rectangular cross section. The outlet typically has the form of a segment of an annulus. A plurality of combustor transitions installed in the gas turbine form an annulus for guiding the hot gas flow into the turbine.

According to a first embodiment at least one side wall has a side wall extension which is extending in a downstream direction beyond the outlet at the downstream end of the combustor transition. The side wall extension at least partly encloses a first resonator volume. In one embodiment, the side wall extensions of two combustor transitions are configured such that, when installed next to each other in a gas turbine, the side wall extensions at least partly enclose a first resonator volume. Further, at least one side wall extension comprises a resonator hole (also called damper hole), which is configured as a neck of a Helmholtz-damper, which fluidly connects the resonator volume with the hot gas flow path.

According to an embodiment the first resonator volume of the combustor transition is limited at the upstream end by a first separating member In a further embodiment the first resonator volume of combustor transitions comprises a volume, which is at least partly enclosed by the side walls of two combustor transitions when installed next to each other in a gas turbine. This first resonator volume is limited at the upstream end by a second separating member.

In yet another embodiment the combustor transition comprises the first resonator volume limited the upstream end by the first separating member and in addition a second resonator volume, which is at least partly enclosed by the side walls of two combustor transitions when installed next to each other in a gas turbine. This second resonator volume is further limited at the upstream end by a second separating member. In addition, the first separating member comprises a second resonator hole, which connects the first resonator volume and the second resonator volume, and which is configured as neck of a Helmholtz-damper. Thus, at least two different pulsation frequencies can be suppressed by the arrangement of the two resonating volumes.

According to another embodiment the combustor transition comprises a hollow insert, which delimits the first resonator volume. A hollow insert can also be used to delimit the second resonator volume or a hollow insert can be used to delimit the first and second or another multitude of resonator volumes.

When installed in a gas turbine the combustor transitions including the side wall extensions are exposed to hot gases on the side walls facing the hot gas flow path. Cooling of the side walls and the side wall extensions is therefore advantageous. According to one embodiment the combustor transition comprises a cooling air supply to the first resonator volume and/or the second resonator volume for cooling of the side wall, respectively of the side wall extension.

In yet another embodiment the combustor transition has a first side wall which ends at the outlet of the combustor transition, and a second side wall which has a side wall extension, which is extending in a downstream direction beyond the outlet at the downstream end of the combustor transition. This side wall extension has a U-shaped cross-section, with a first leg of the U-shaped extension connected to the second side wall. The extension is separating a hot gas side from a cooling side and a second leg of the U-shaped extension is beginning directly downstream of the outlet on the cooling side of the first side wall extension, and can be arranged substantially parallel to the first leg. The second leg is connected to the first leg by a third leg at the downstream end. The U-shaped extension is thereby forming a resonator volume between the first leg, the second leg, and the third leg. The third leg is typically shorter than the first and second leg, for example less than half the length of the first leg.

The second leg of the U-shaped extension is configured such that the second leg of the extension begins directly downstream of the first sidewall of a neighboring combustor transition, which has no extension, to form one streamlined contour on the hot gas side of the first side wall/second leg, when two combustor transitions are installed next to each other in a gas turbine.

According to an embodiment the resonator volume formed by one or more side wall extensions is closed towards the outer wall, i.e. when installed in the gas turbine at the end of the resonator volume, which is facing the outer vane platform of the first turbine stage, and/or towards the inner wall, i.e. when installed in the gas turbine at the side of the cooling space, which is facing the inner vane platform of the first turbine stage.

The resonator volume can be closed towards the outer wall and/or towards the inner wall by an end plate.

According to a further embodiment the end plate towards the wall, and/or towards the inner wall is split into a first end plate and into a second end plate by the split line. Each of the first and second end plate can be connected to the first and second end wall extension (e.g. by brazing or welding) of form an integral part of the corresponding end wall extension (e.g. in a casted or machined part).

During operation the transition piece side walls and transition piece side wall extensions are exposed to the combustion chamber's hot gases. Therefore it can be advantageous for the live time of these parts to provide them film cooling and or effusion cooling. According to a further embodiment the film cooling and/or effusion cooling holes are provided in the walls of the resonator volume, i.e. in the side walls of the combustor transition side wall and/or the side wall extension.

According to another embodiment the end plate is at least partly separated from the first side wall extension by a gap and at least partly connected to the second side wall extension. This embodiment can be advantageous for cases in which the second side wall extension extends further downstream of the combustor transition outlet. When every second combustor is removed the respective side of the shorter first extension will then offer an unobstructed access for baroscopic inspection of the adjacent hot gas flow path.

Besides the transition piece a can combustor comprising such a combustor transition piece is an object of the disclosure. The transition piece can be a separate component, which is connected to the can combustor, or it can be an integral part of the can combustor. The can combustor and transition piece can for example be casted, extrusion formed, or manufactured by welding or brazing Further, a gas turbine comprising such a combustor transition piece is an object of the disclosure. The gas turbine has at least one compressor, at least one turbine, and at least one can combustor. Further, the disclosed combustor transition is installed between the can combustor and the turbine.

When installed in a gas turbine the side wall extension of a combustor transition is extending downstream into a space between the inner and outer platform of a vane one of the turbine. When installed the side wall extension is ending directly upstream of an airfoil of the vane one. Adjacent first and second side wall extension and the subsequent airfoil can be arranged such that their surfaces are aligned to form one smooth surface facing the hot gas flow path.

To minimize losses during the operation of the gas turbine the at least one side wall extension is extending downstream to the leading edge of a vane one airfoil such that in only leave a gap which is sized to allow for thermal expansion between the can combustor and turbine.

The proposed combustor transition can be used for new gas turbines as well as for retrofitting existing gas turbines. A method for retrofitting a gas turbine comprises the steps of opening the gas turbine housing, removing at least one existing combustor transition, installing at least one of the disclosed combustor transitions with a side wall extension, and of closing the gas turbine housing.

To give access for baroscopic inspection of the hot gas flow path inspection the can combustor and/or combustor transition can be removed. To reduce the time required for removal of combustor transitions it is advantageous if only a part of the transition needs to be removed. However, with the side wall extension access from one combustor to the hot gas flow path of a neighboring hot gas transition is restricted. To reduce the number of combustor transitions, which have to be removed, a method for borescope inspection of a gas turbine with a combustor transition which has a no or only a short side wall transition on one side of the outlet is proposed: According to this method every second combustor transition is removed for inspection and the hot gas path downstream of the removed combustor transition and the inspection of the hot gas path of the neighboring combustor, which remains installed in the gas turbine. The neighboring combustor is inspected via the gap, which is opened by removing the side wall extension together with the removed combustor transition.

Inspection of the hot gas path can be done in combustor hot gas paths even further apart if the resonator holes are arranged in both side walls of a side wall extension, and these are sufficiently aligned and large enough to allow passing of a borescope.

The above described combustor transition, can combustor and gas turbine can be a single combustion gas turbine or a sequential combustion gas turbine as known for example from EP0620363 B1 or EP0718470 A2. It can also be a combustor transition of a gas turbine with one of the combustor arrangements described in the WO2012/136787. The disclosed retrofit method as well as baroscopic inspection method can be applied to a single combustion gas turbine or a sequential combustion gas turbine.

BRIEF DESCRIPTION OF THE DRAWINGS

The invention, its nature as well as its advantages, shall be described in more detail below with the aid of the accompanying drawings. Referring to the drawings:

FIG. 1b shows a cross section of the turbine inlet with combustor transitions of the gas turbine from FIG. 1a.

DETAILED DESCRIPTION

The same or functionally identical elements are provided with the same designations below. The examples do not constitute any restriction of the invention to such arrangements.

Figure 1A:
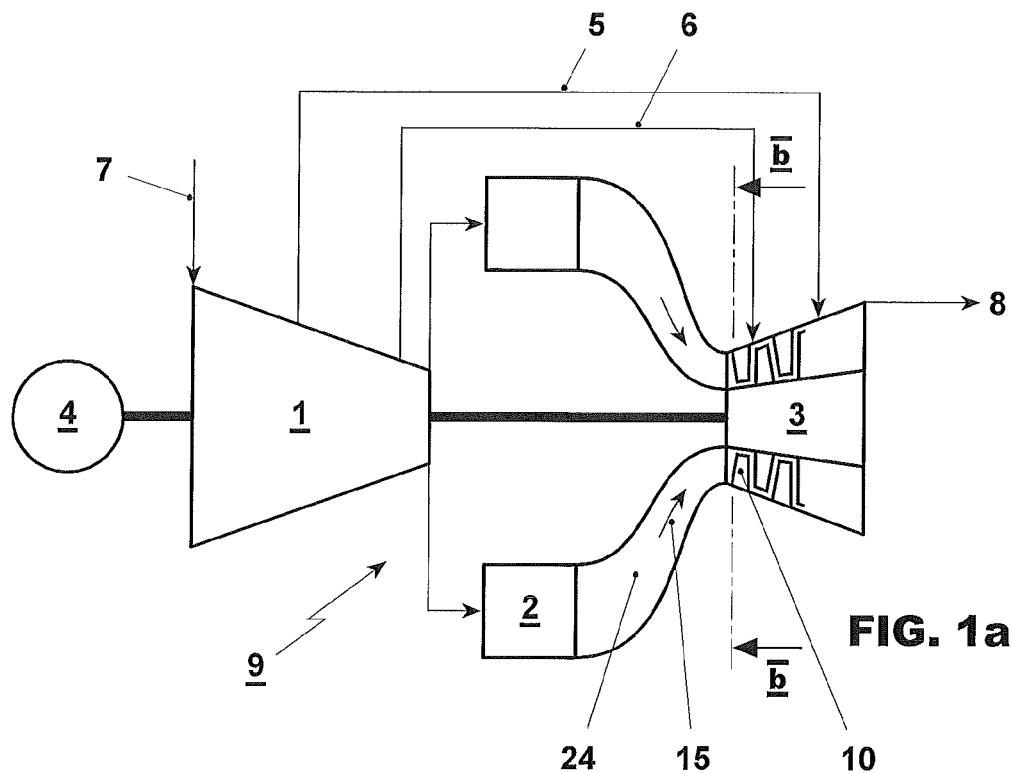
FIG. 1a shows an example of a gas turbine according to the present invention.

An exemplary arrangement is shown in FIG. 1*a*. The gas turbine 9 is supplied with compressor inlet gas 7. In the gas turbine 9 a compressor 1 is followed by a combustion chamber comprising a plurality of can combustors 2. Hot combustion gases are fed into a turbine 3 via a plurality of combustor transitions 24. The can combustors 2 and combustor transition 24 form a hot gas flow path 15 leading to the turbine 3. The combustor transition 24 connects the can combustors 2 of the combustion chamber with the vane one 10 of the turbine 3.

Cooling air 5, 6 is branched off from the compressor 1 to cool the turbine 3 and combustor. In this example the cooling systems for high pressure cooling air 5 and low pressure cooling air 6 are indicated.

Exhaust gas 8 leaves the turbine 3. The exhaust gas 8 is typically used in a heat recovery steam generator to generate steam for cogeneration or for a water steam cycle in a combined cycle (not shown).

Figure 1B:
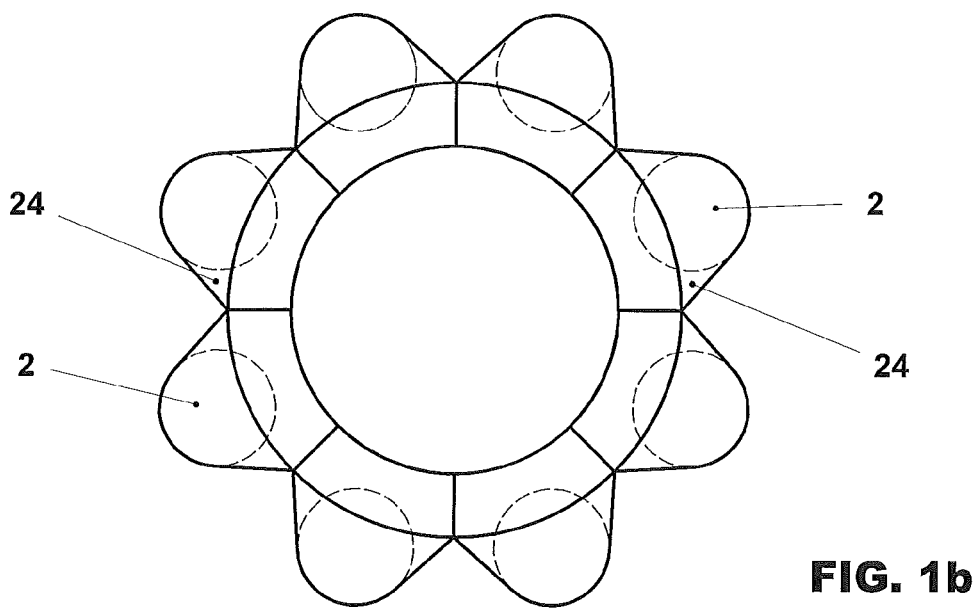

The combustor transitions 24 of the gas turbine 9 of the cross section B-B are shown in FIG. 1*b*. The combustor transitions 24 guide the hot gases from the can combustors 2 to the turbine and are arranged to form an annular hot gas duct at the turbine inlet.

Figure 2:
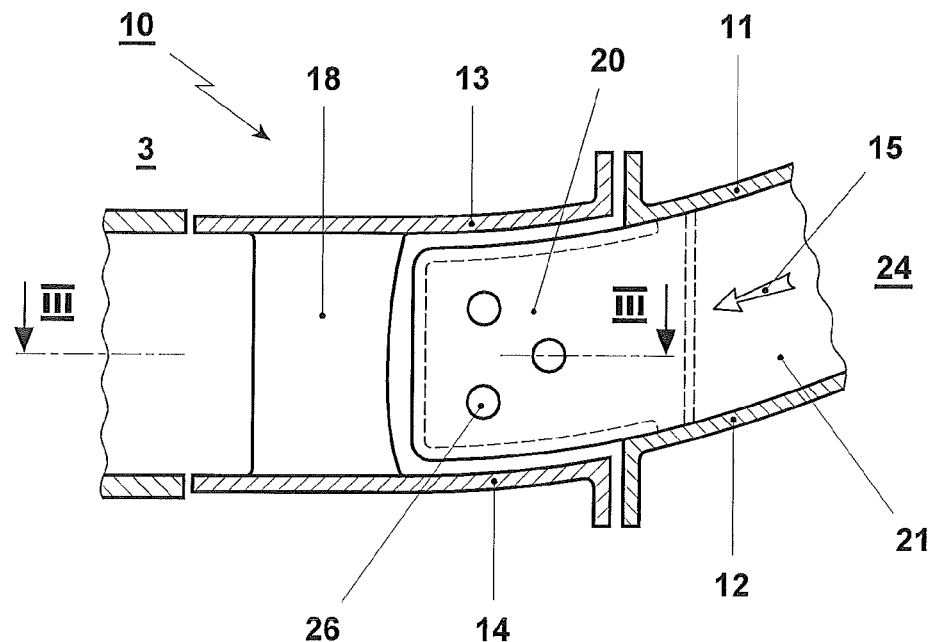
FIG. 2 shows an example of a combustor transition arrangement with a vane one of a turbine according to the present invention.

An example for the interface between combustor transition 24 and the vane one 10 is shown in more detail in FIG. 2. Inside the combustor transition 24 the combustor transition outer wall 11, the combustor transition inner wall 12 and the side walls 21 confine the hot gas flow path 15. At the outlet of the combustor transition 24 the cross section of each combustor transition has the geometrical shape of a sector of the annulus, which forms the hot gas flow path 15 at the turbine inlet. The flow path continues into the vanes one 10 of the turbine 3. The inner platforms 14 and outer platforms 13 delimit the hot gas flow path in the turbine inlet. The airfoils 18 of the turbine vanes 10 extend in radial direction between the inner platform 14 and outer platform 13 of the vane one 10 and at least partly divide the hot gas flow in the circumferential direction. To separate the hot gas flow path 15 into decoupled sections the side wall extension 20 is reaching into the upstream end of the turbine 3, extending into the space confined by the inner vane platform 14 and outer vane platform 13. Decoupling is achieved by a resonator volume (only indicated by dotted walls in FIG. 2). The resonator volume is fluidly connected the hot gas flow path 15 by at least one resonator hole 26 which is designed as a neck of a Helmholtz damper. In particular the cross sectional area of the at least one resonator hole 26 can be adjusted such that in combination with the resonator volume 28 at least one critical frequency can be dampened.

The side wall 20 of combustor transition 21 can be arranged upstream of the airfoil 18 and a side wall extension 20 is extending into the space confined by the inner vane platform 14 and outer vane platform 13. In this case the side wall extension 20 ends upstream of the leading edge of the airfoil 18. Thus decoupling is achieved by a combination of dampening with the Helmholtz damper and by at least partly blocking the fluid connection between two neighboring combustors. Since the flow velocity in the first vane typically can reach the speed of sound and coupling of two combustors via the downstream areas of the vane one 18 is not possible. As shown in FIG. 2 typically a gap can remain between the airfoil 18 and the side wall extension 20 to allow for axial movements to thermal expansions in the turbine and in the combustor. Typically, the airfoil 18 and side wall extension 20 should not touch each other to avoid mechanical damage of the parts, in particular of a coating or thermal barrier coating which can be applied to the surface of the parts.

Figure 3:
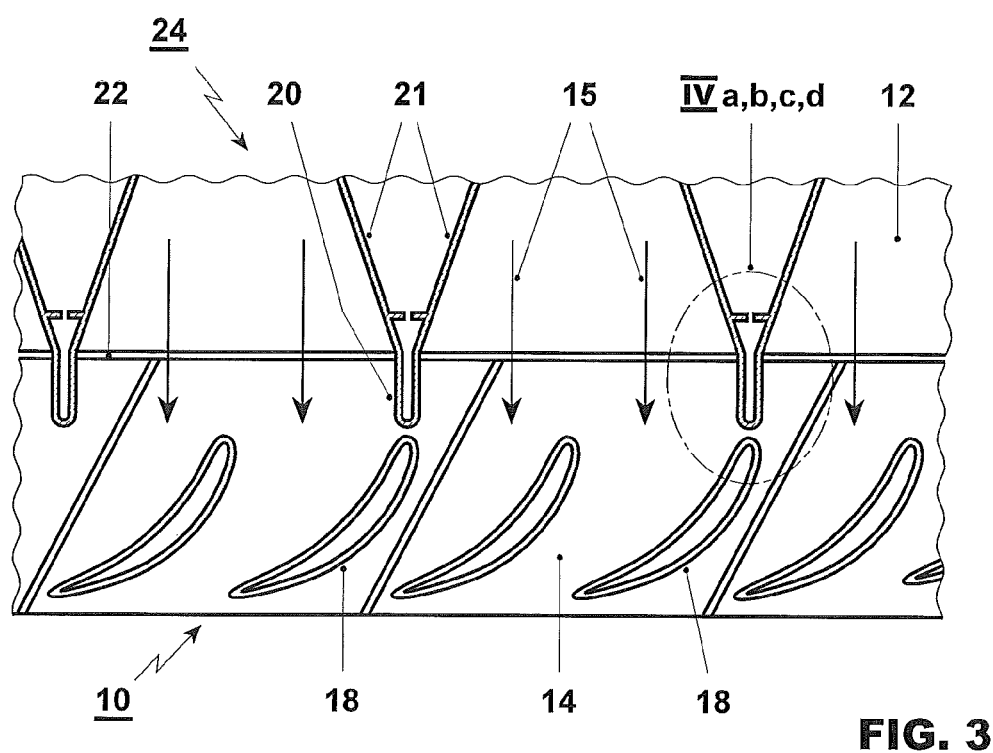
FIG. 3 shows a cross section III-III of FIG. 2 with the combustor transition arrangement and vane one.

The cross section III-III from FIG. 2 of the combustion transitions 24 and the vanes one 10 is shown in FIG. 3. In this example vane arrangements comprising two airfoils 18 arranged between one inner and one outer platform 13, 14. In this example one such vane arrangement with two airfoils 18 is arranged downstream of each combustor transition 24.

The number of airfoils per inner- and outer platform (vane arrangement) is not limited to two and can be any integer number. Also the number of airfoils allocated to each transition peace is not limited to two but can be any number. Because an arrangement with side wall extension only every other combustor transition or every second, third, fourth etc. combustor transition can be used, the number of airfoils allocated to each transition peace is not limited to integer numbers. Inside the combustor transition 24 the hot gas flow path 15 is divided into separate channels by the combustor transition side walls 21. The vanes 10 are arranged downstream of the combustor transition 24. Upstream of every second airfoil 18 a side wall extension 20 extends to the upstream end of the airfoil 18.

Different ways to design a combustor transition side wall extension 20 are possible. The details of four examples of such side wall extensions are shown in FIGS. 4*a, b, c* and *d*.

Figure 4A:
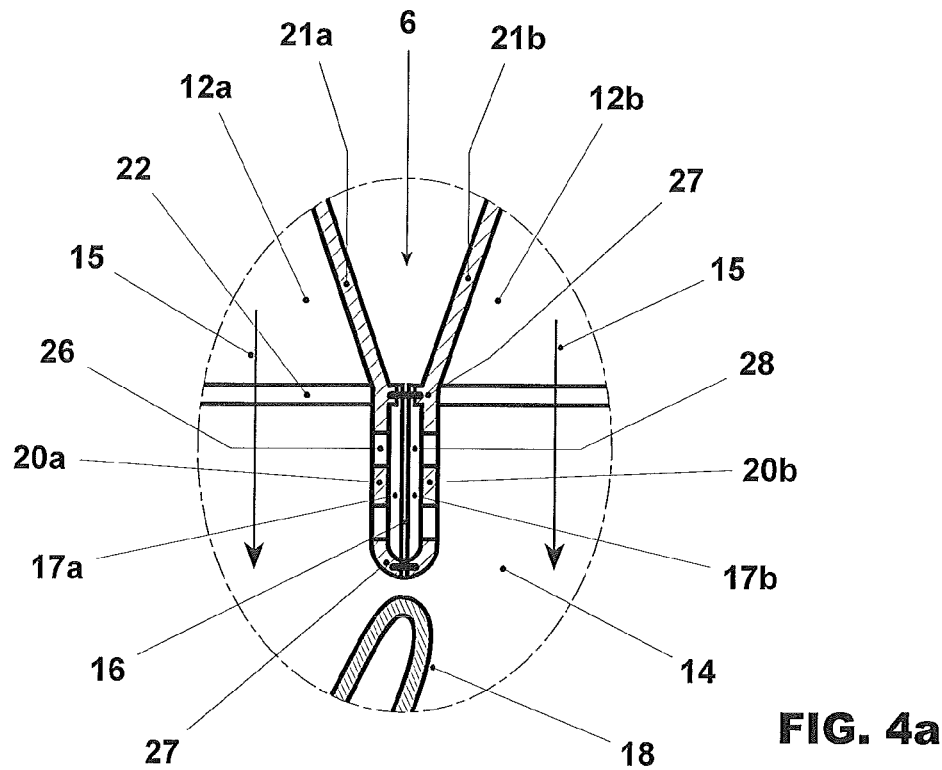
FIG. 4*a, b, c, d* shows details of examples of different embodiments of combustor transition side wall extensions.

In the example of FIG. 4*a* the right combustor transition side wall 21*a* of a first combustor transition 24 and the left combustor transition side wall 21*a* of the neighboring combustor transition end next to each other at the outlet 22 of the combustor transition. The right combustor transition side wall 21*a* is extended downstream to form a right side wall extension 20*a* and the left combustor transition side wall 21*b* is extended downstream to form a left side wall extension 20*b*. Both side wall extensions 20*a*, 20*b* are arranged next to each other (in this example parallel to each other) thereby forming a side wall extension 20 comprising a duct or first resonator volume 28 between the inner vane one platform 14 and the outer vane one platform. This first resonator volume 28 is closed towards the space between the right combustor transition side wall 21*a* of a first combustor transition 24 and the left combustor transition side wall 21*a* of the neighboring combustor transition by a first separating member 25 comprising a seal 27. For cooling high pressure cooling air 6 can supplied to the first resonator volume 28 from the space between the right combustor transition side wall 21*a* of a first combustor transition 24 and the left combustor transition side wall 21*a* of the neighboring. In the example shown cooling air is supplied as leakage air via the seal 27. To reduce the cooling air losses the left and right side wall extensions 20*a*, 20*b*, can be bend towards each other at their downstream end as shown in FIG. 4*a*. In addition, to reduce the cooling air losses the channel between the left and right side wall extensions 20*a*, 20*b* can be closed by an end plate 17 at the side radially outer and inner end of the side wall extensions 20*a*, 20*b*, i.e. at the end facing the inner side vane platform 14 and/or at the end facing the outer vane platform 13. In the example shown in FIG. 4*a* the end plate 17 comprises a left end plate 17*a*, which is attached to the left side wall extensions 20a, and a right end plate 17b, which is attached to the right side wall extensions 20b.

Between the left and right end plates 17a, 17b at the inner and/or outer position a gap or split line 16 can remain open to allow for thermal extension and assembly tolerances. Also between the downstream ends of the left and right side wall extensions 20a, 20b a gap 23 can be foreseen to allow for thermal extension and assembly tolerances. To better defined, closed resonance volume 28, and to reduce cooling air loses these gaps 16, 23 can be closed by seals 27.

In the examples shown in FIG. 4 the left and right side walls of the resonator volume 28 have resonator holes 26. Embodiments with a resonator hole 26 in only the left or only the right side wall of the resonator volume 28 are also conceivable.

Figure 4B:
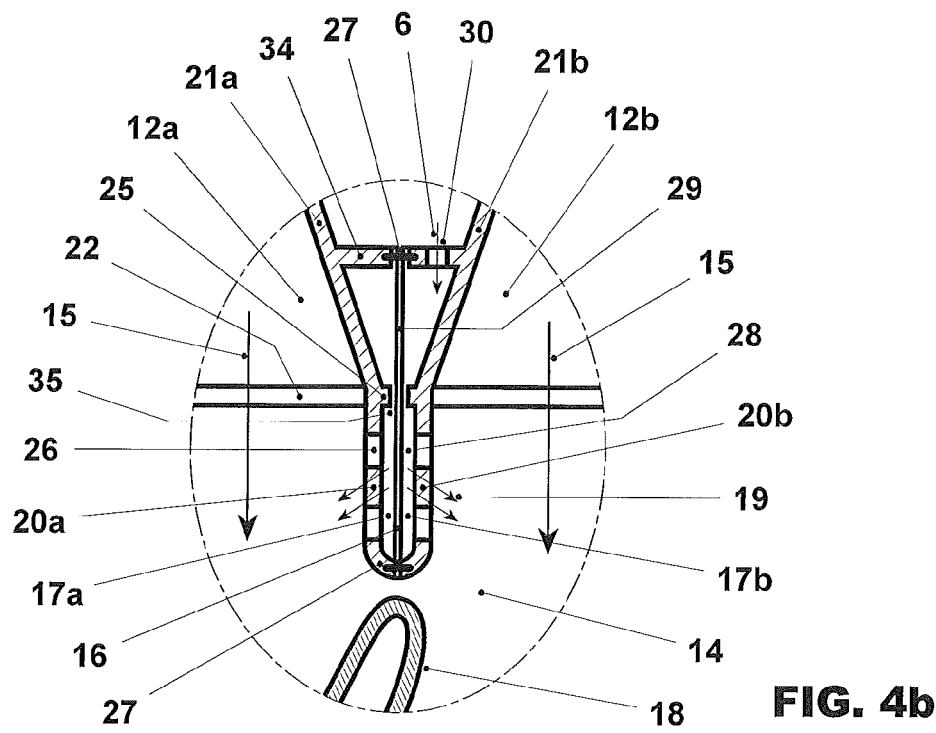

FIG. 4b shows an alternative resonator volume arrangement. In this example a second resonator volume 29 is at least partly enclosed by a downstream section of left combustor transition side wall 21a, a downstream end of the right combustor transition side wall 21, and a second separating member 34. In this example the second separating member 34 comprises walls sections connecting two neighboring combustor transition side walls 21a, 21b. To avoid direct contact of the two side walls a gap remains between the two side walls 21a, 21b, which can be closed by a seal 27. The first resonance volume 28 is fluidly connected to the second resonator volume 29 by the second resonator hole 29.

The second separating member 34 comprises a cooling air supply hole 30 for the supply of high pressure cooling air 6 to the first resonator volume 28 and second resonator volume 29. High pressure cooling air 6 first is introduced into the second resonator volume 29 via the cooling air supply hole 30. Part of the cooling air can be used for cooling of the downstream side ends of the combustor transition side walls 21a, 21b for example by effusion and/or film cooling (not shown). The remaining cooling air is supplied to the first resonator volume 28 via the second resonator hole 35.

For better cooling of the combustor transition side wall extension 20 film cooling and/or effusion cooling holes 19 are provided in the left and right combustor transition side wall extensions 20a, 20b. Film cooling and/or effusion cooling holes can be provided for all of the examples in FIGS. 4a, 4b, 4c and 4d as well as any other side wall extension arrangement.

The example of FIG. 4b has the advantage that the two resonator volumes 28, 29 with two resonator holes 26, 35 allow for tuning of at least two frequencies. The increased volume of also allows dampening of low frequencies.

Figure 4C:
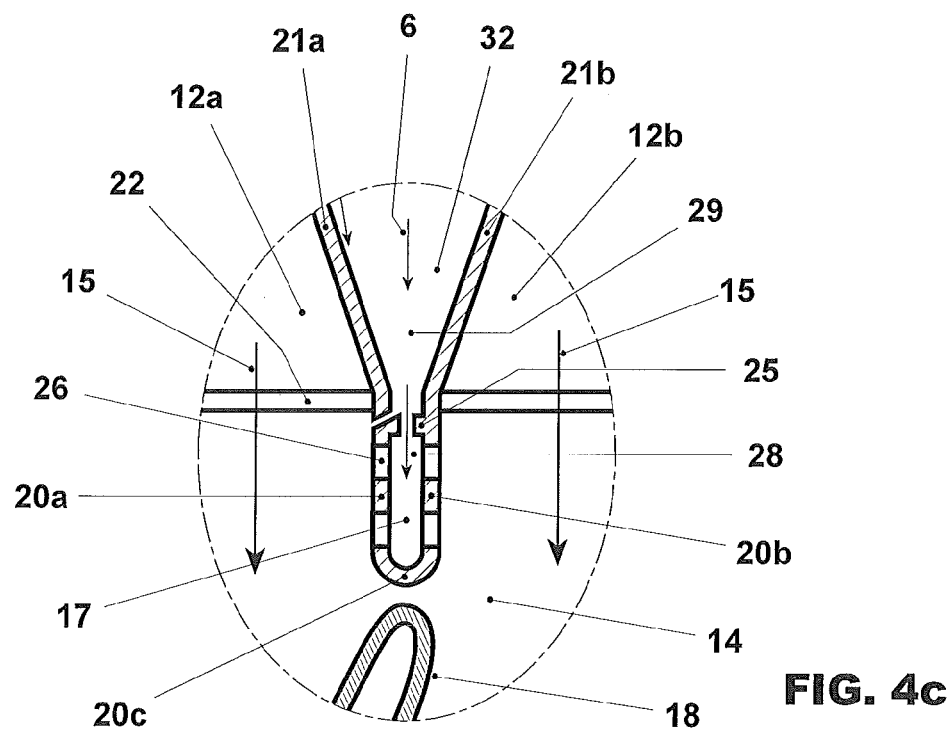

The third example shown in FIG. 4c shows an alternative end wall extension. In this example the left combustor transition side wall 21a ends at the outlet 22 without an extension. Only the right combustor transition side wall 21b is extended to form the combustor transition side wall extensions 20. Here the right combustor transition side wall extension 20b does not end at the downstream end but the side wall extension of the right side wall 21b has a U-form and the left combustor transition side wall extension 20a is connected to the right combustor transition side wall extension 20b at the downstream end. The U-form includes the first leg 20b, the second leg 20a, and a third leg 20c. In this example the end plate 17 is provided as one piece connecting the left and right side wall extensions 20a, 20b. In this example the first separating member 25 can be part of the right combustor transition side wall extension 20b. Thus, the resonator volume 28 is enclosed can be enclosed by only one side wall extension 20b with end plates 17 closing it. This design does not require any seals and therefore a defined volume with defined openings, i.e. the resonator hole(s) 26 can be provided. This design also reduces or avoids cooling air losses along seal lines. Additionally, for inspections of the outlet 22 area downstream of two neighboring combustor transitions 24 only one combustor transition 24 has to be removed.

Figure 4D:
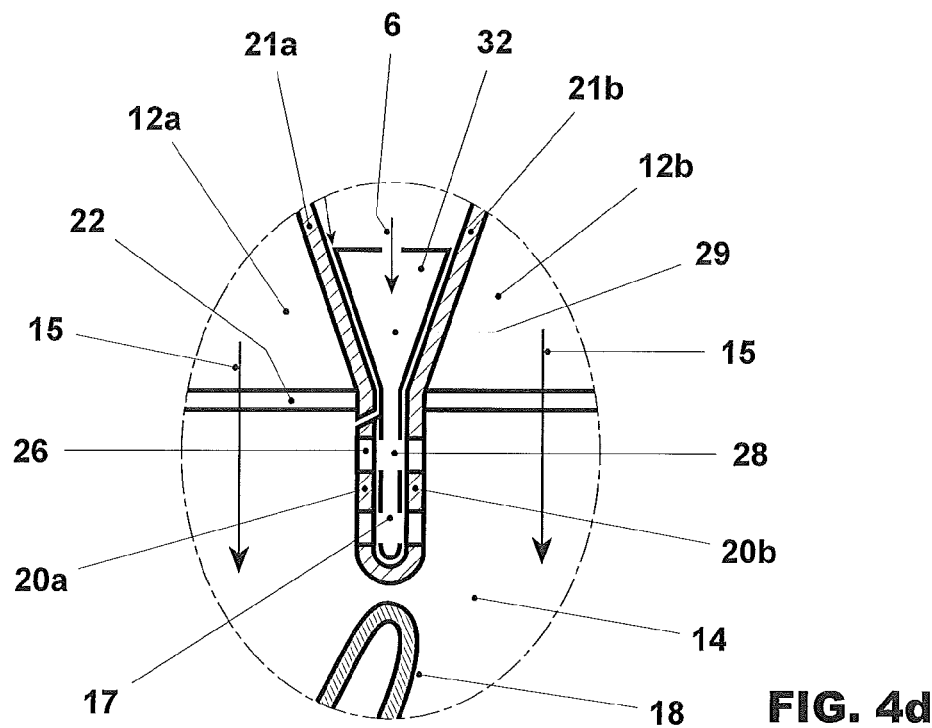

In the example of FIG. 4d a hollow insert 32 is used to define the resonator volume. The hollow insert can be limited to the space between the side wall extensions 20a, 20b. In this case the insert is arranged in the space between the side wall extensions 20a, 20b and extends into the space between the two neighboring the combustor transitions side walls 21. The hollow insert 32 is designed to follow the contour of the side walls 20a, 20b and the side wall extensions 21a, 21b of two neighboring combustor transitions 24 on the side facing away from the hot gas flow path 15. They are closed radially towards the outside and inside and thereby form a defined resonator volume. The side walls of the insert 32 has at least one hole aligned with the at least one resonator hole 26 in the side wall extension 21a, 21b. On the upstream side the hollow insert 32 comprises a hole for high pressure cooling air 6 supply.

The hollow insert 32 can comprise a separating member (not shown) to divide the volume enclosed by the hollow insert 32 into two or more resonator volumes 28, 29.

In the example of FIG. 4d the insert is completely enclosing the resonator volume 28, 29. However, a semi-closed insert, which is attached at least partly to a side wall 21 and/or side wall extension 20 can be used. In this case the resonator volume 28, 29 is delimited by a combination of the insert walls and the side wall 21 and/or side wall extension 20.

For all embodiments the combustor transition side wall extension 20, 20a 20b can be one integral part of the combustor transition side wall 21, 21a 21b, for example in a casted, bended, pressed or forged piece. They can also be attached or fixed to the combustor transition side wall 21, 21a 21b, for example by welding, brazing, screws or rivets.

The end plate 17, 17a, 17b can be one integral part of the side wall extension(s) 20, 20a 20b, for example in a casted, bended, pressed or forged piece. The can also be attached or fixed to the combustor transition side wall extension 20, 20a 20b, for example by welding, brazing, screws or rivets.

What is claimed is:
1. A combustor transition adapted to guide combustion gases in a hot gas flow path extending between a gas turbine combustion chamber and a first stage of a turbine, the combustor transition comprising:
    a duct having an inlet at an upstream end adapted for connection to the combustion chamber and an outlet at a downstream end adapted for connection to the first stage of the turbine, wherein the downstream end comprises an outer wall, an inner wall, a first side wall and a second side wall, wherein at least one side wall has a side wall extension which extends in a downstream direction beyond the outlet and wherein the side wall extension at least partly encloses a first resonator volume or wherein the first and second side wall extensions of two combustor transitions are configured such that the first and second side wall extensions, when installed next to each other in a gas turbine, at least partly encloses a first resonator volume, and wherein at least one side wall extension comprises a resonator hole, which is configured as a neck of a Helmholtz-damper.

2. The combustor transition according to claim 1, wherein the first resonator volume has a resonator upstream end, which is limited by a first separating member.

3. The combustor transition according to claim 1, wherein the first resonator volume comprises a volume, which is at least partly enclosed by the side walls of the two combustor transitions when installed next to each other in a gas turbine, and wherein the first resonator volume is limited at an upstream end by a separating member.

4. The combustor transition according to claim 2, wherein the combustor transition comprises a second resonator volume which is at least partly enclosed by the side walls of the two combustor transitions when installed next to each other in a gas turbine and is further limited at an upstream end by a second separating member, and wherein the first separating member comprises a second resonator hole connecting the first resonator volume and the second resonator volume configured as a neck of a Helmholtz-damper for suppression of at least two pulsation frequencies.

5. The combustor transition according to claim 1, wherein the combustor transition comprises a hollow insert, which delimits the first resonator volume and/or a second resonator volume.

6. The combustor transition according to claim 1, further comprising a cooling air supply to the first resonator volume and/or a second resonator volume.

7. The combustor transition according to claim 1, wherein the first side wall ends at the outlet and wherein the second side wall has a side wall extension which extends in a downstream direction beyond the outlet and forms U-shaped cross-section, wherein a first leg of the U-shaped extension is connected to the second side wall, separating a hot gas side from a cooling side, and a second leg of the U-shaped extension begins directly downstream of the outlet on the cooling side of the first leg, and is connected to the first leg by a third leg at a downstream end, thereby at least partly enclosing the first resonator volume.

8. The combustor transition according claim 1, wherein the first resonator volume is closed towards the outer wall and/or towards the inner wall by an end plate.

9. The combustor transition according to claim 8, wherein the walls of the first resonator volume comprises film cooling and/or effusion cooling holes.

10. A can combustor with a combustion chamber, further comprising a combustor transition according to claim 1.

11. A gas turbine with at least one compressor, at least one turbine, and at least one combustion chamber, further comprising a combustor transition according to claim 1.

12. The gas turbine according to claim 11, wherein the side wall extension extends downstream of the combustor transition into a space between an inner and outer platform of a vane one directly upstream of an airfoil of the vane one.

13. The gas turbine according to claim 12, wherein at least one side wall extension extends downstream to the leading edge of the vane one airfoil leaving a gap which is sized to allow for thermal expansion between the combustion chamber and turbine.

14. A method for retrofitting a gas turbine comprising the steps of opening a gas turbine housing, removing at least one existing combustor transition, installing at least one combustor transition according to claim 1, and of closing the gas turbine housing.

15. A method for borescope inspection of a gas turbine with a combustor transition according to claim 7, wherein every second combustor transition is removed for inspection and the hot gas path downstream of the removed combustor transition as well as the hot gas path of a neighboring combustor, which remains installed in the gas turbine is inspected via a gap which is opened by removing the side wall extension together with the removed combustor transition.

* * * * *